United States Patent [19]

Slaats

[11] 4,335,709
[45] Jun. 22, 1982

[54] SOLAR COLLECTOR

[75] Inventor: Antonius A. A. Slaats, Eindhoven, Netherlands

[73] Assignee: U.S. Philips Corporation, New York, N.Y.

[21] Appl. No.: 112,873

[22] Filed: Jan. 17, 1980

[30] Foreign Application Priority Data

Jan. 26, 1979 [NL] Netherlands ............... 7900621

[51] Int. Cl.³ .................................... F24J 3/02
[52] U.S. Cl. .................................... 126/443; 126/433; 126/446; 126/449; 126/450; 165/104.21
[58] Field of Search .............. 126/443, 433, 417, 446, 126/449, 450; 165/105, 76, 104.21; 138/96 R, 96 T

[56] References Cited

U.S. PATENT DOCUMENTS 3,405,299 10/1968 Hall et al. .................... 165/105 X
4,067,315 1/1978 Fehlner et al. .................... 126/433
4,226,282 10/1980 Kunsagi et al. .................... 165/105

FOREIGN PATENT DOCUMENTS 7704598 11/1977 Netherlands .................... 126/433

Primary Examiner—Larry Jones
Attorney, Agent, or Firm—Thomas Briody; William J. Streeter; Rolf E. Schneider

[57] ABSTRACT

A heat pipe solar collector comprises an evacuated transparent envelope spaced from and surrounding the evaporation zone and a protective jacket spaced from and surrounding the condensation zone. The protective jacket is connected to the transparent envelope to protect the joint between the transparent envelope and the heat pipe against damage and is provided with openings for the passage of a heat-absorbing medium.

2 Claims, 6 Drawing Figures

SOLAR COLLECTOR

This invention relates to a solar collector, comprising a sealed tube which has an evaporation zone for absorbing heat derived from incident solar radiation and a condensation zone for giving off heat, a quantity of evaporable heat transport medium in the tube which completes an evaporation/condensation cycle between the two zones during operation, and an evacuated, transparent envelope which surrounds the evaporation zone and which includes an envelope/tube joint which is situated between the two zones.

A solar collector of the described kind is known from U.S. Pat. No. 4,067,315.

The transparent envelope is usually made of glass. The tube filled with the quantity of evaporable heat transport medium (heat pipe) has metal or glass walls. The tube may contain a capillary structure for the return of condensed heat transport medium from the condensation zone to the evaporation zone.

In the absence of a capillary structure, the solar collector is arranged so that the condensation zone is at a higher level than the evaporation zone in the operating condition. Condensate is then returned to the evaporation zone under the influence of gravity.

The joint between the transparent envelope and the tube, usually a glass-to-metal joint and sometimes a glass-to-glass joint, is problematic in the above described solar collector. Even light shocks cause fracturing of the glass vacuum envelope at the area of this joint.

The present invention has for its object to provide such an improved solar collector kind in which the envelope/tube joint is protected against damage due to shocks etc. in a structurally simple manner.

In order to realize this object, the solar collector in accordance with the invention is characterized in that, for the protection of the envelope/tube joint, a jacket is provided around and at a distance from the tube part which contains the condensation zone, the jacket being connected to the transparent envelope and being provided with circumferential openings for the passage of a heat-absorbing medium.

Preferably, the protective jacket is constructed as a sleeve in accordance with the invention.

In a preferred embodiment of the solar collector in accordance with the invention, the protective jacket is cemented to the transparent envelope via a cap. The protective jacket and the cap may consist of one piece of material and may be made of metal, quartz glass or a synthetic material.

The invention will now be described in detail with reference to the accompanying drawing, in which:

FIGS. 2b and 2c are cross-sectional views taken along the lines IIb-IIb and IIc-IIc, respectively, of FIG. 2a.

Figure 1A:
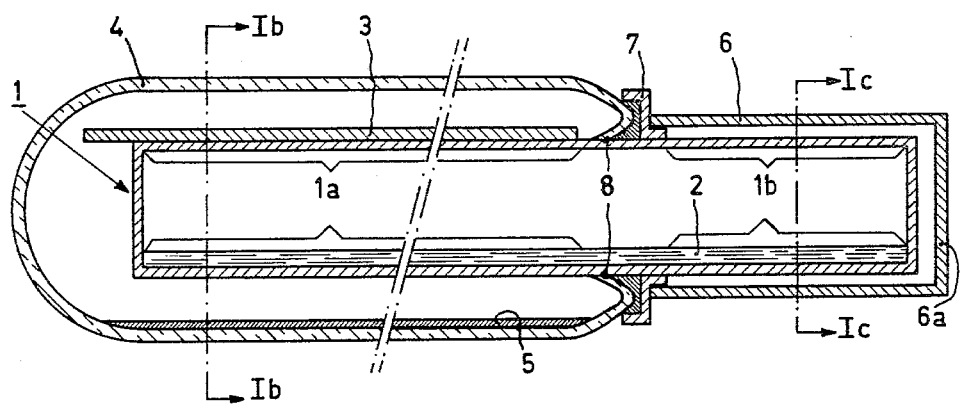
FIG. 1a is a longitudinal sectional view of a solar collector.

Reference numeral 1 in FIG. 1a denotes a sealed metal tube, for example, a copper tube, which comprises an evaporation zone 1a and a condensation zone 1b. Inside the sealed tube 1 there is provided a quantity a vaporizable heat transport medium 2, for example, water or a "Freon".

The evaporation zone 1a is connected in a heat-conductive manner to a flat plate 3 which acts as an absorber for incident solar radiation during operation.

Figure 1B:
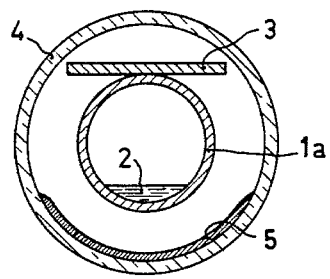
FIGS. 1b and 1c are cross-sectional views, taken along the lines Ib-Ib and Ic-Ic of FIG. 1a, respectively.

The absorber plate 3 is accommodated together with the part of the tube 1 comprising the evaporation zone 1a, in an evacuated glass envelope 4, the lower half of which is provided on its inner surface with a reflective layer 5, for example, an aluminium or silver mirror (FIG. 1b). If desired, the inner surface of the envelope 4 may also be provided with a light-transmitting but infrared-reflective layer of, for example, indium oxide.

Around the part of the tube which projects from the glass envelope 4 and which comprises the condensation zone 1b there is provided a metal jacket 6 in the form of a sleeve which is closed at one end 6a and which is connected at its other end to a metal cap 7 (for example, by welding). The cap 7 itself is cemented to the glass envelope 4. The sleeve 6 protects the projecting part of the tube 1 against shocks, thus protecting the glass-to-metal seal or joint 8.

Figure 1C:
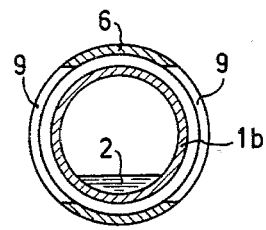

The sleeve 6 includes slots 9 (FIG. 1c) for the passage of a medium which takes up heat from the condensation zone 1b.

During operation, the condensation zone 1b is arranged at a level which is higher than that of the evaporation zone 1a, so that heat transport medium which evaporates due to the taking up of heat in the evaporation zone and which condenses in the condensation zone due to the giving off of heat, returns to the evaporation zone 1a under the influence of gravity.

Figure 2A:
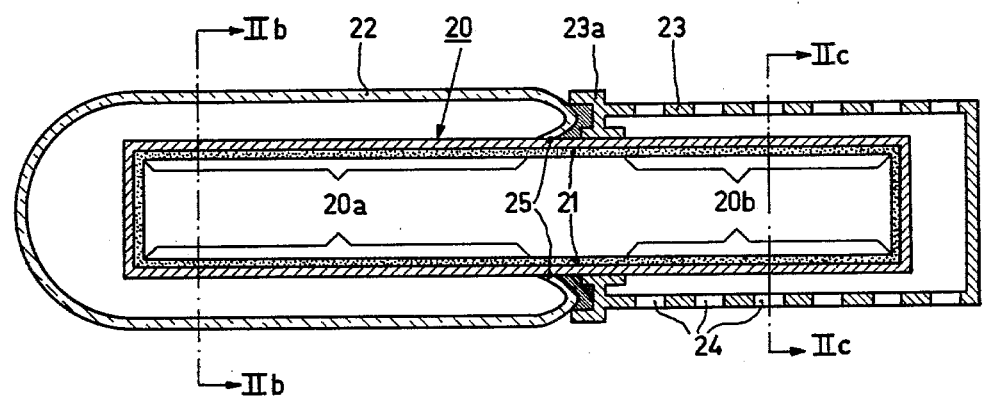
FIG. 2a is a longitudinal sectional view of a further embodiment of a solar collector.
Figure 2B:
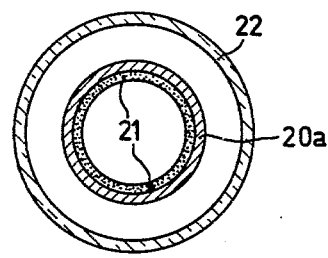
Figure 2C:
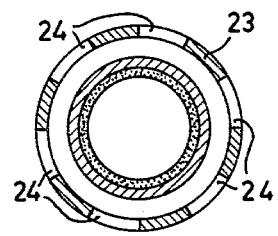

The solar collector shown in FIG. 2a comprises a metal tube 20 which includes an evaporation zone 20a and a condensation zone 20b, a capillary structure 21 which is arranged inside the tube 20, an evacuated glass envelope 22 around the part of the tube 20 which comprises the evaporation zone 20a, and a protective sleeve 23 which is arranged around the part of the tube 20 comprising the condensation zone 20b and which is provided with flow passages 24. The capillary structure 21 which consists of, for example, metal gauze or which is formed by capillary grooves in the wall of the tube 20, ensures in known manner that condensate is transported from the condensation zone 20b to the evaporation zone 20a in a gravity-independent manner. The protective sleeve 23 has an integral cap 23a cemented to the glass envelope 22. Because the sleeve 23 shields the part of the tube 20 which projects from the glass envelope 22, fracturing of the glass at the area of the glass-to-tube joint 25 due to shocks is prevented.

What is claimed is:

1. A solar collector, which comprises a sealed metal tube of circular cross-section having an evaporation zone for absorbing heat derived from incident solar radiation and a condensation zone for giving off heat; an evaporable heat transport medium contained in the tube, said heat transport medium during operation being evaporated in the evaporation zone and being condensed in the condensation zone, with return of the resulting condensate to the evaporation zone; an evacuated transparent glass envelope of circular cross-section spaced from and surrounding the evaporation zone, said envelope being joined to the tube between the two zones by means of a glass-metal seal; a metal sleeve of circular cross-section spaced from and surrounding the condensation zone, said sleeve being provided with openings for the passage of a heat-absorbing medium, said sleeve at its end adjacent to the envelope being provided with a cap; and means joining the cap to the envelope to protect the glass-metal seal against damage.

2. A solar collector according to claim 1, in which said joining means includes a cementing material between the cap and the envelope.

* * * * *